Oct. 26, 1965    L. O. DOWNES    3,213,978
STRUCTURAL FITTINGS
Filed May 18, 1962
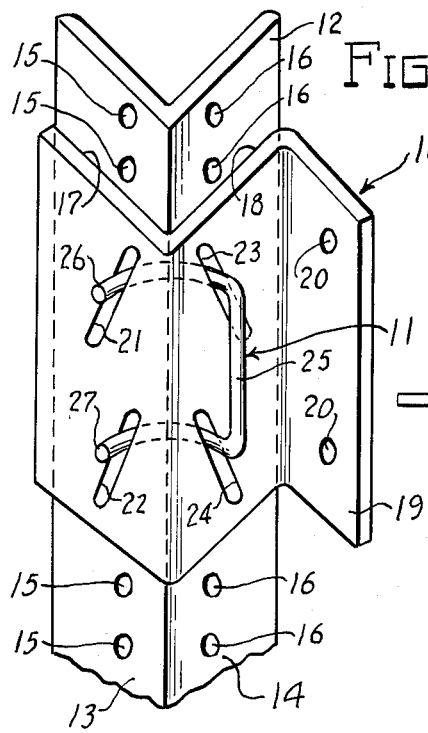
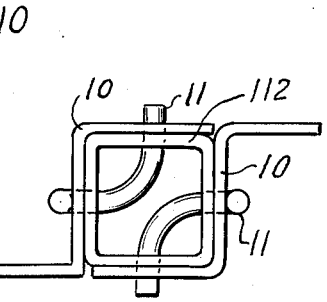
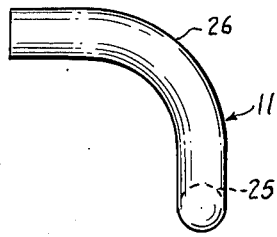
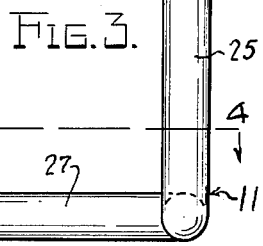
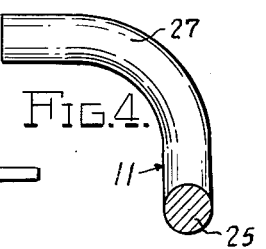
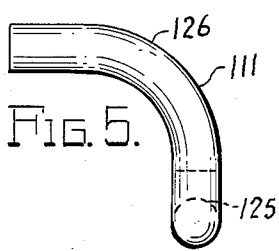
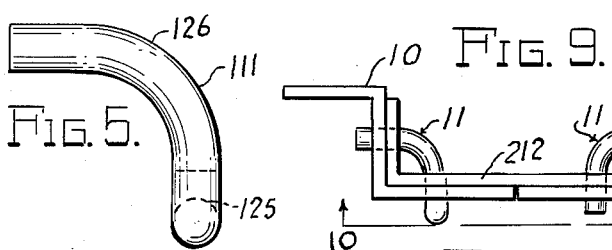
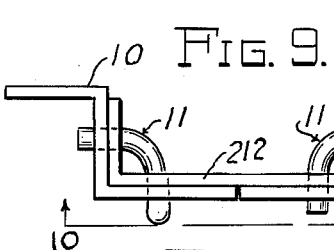
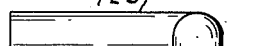
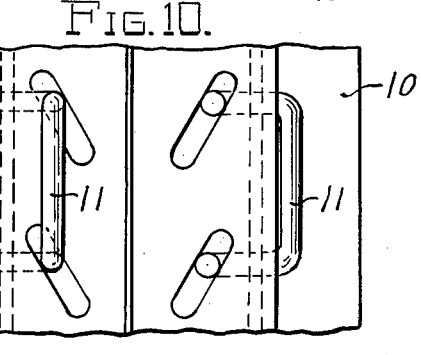
INVENTOR.
Leonard O. Downes
BY
Hanke & Hanke
ATTORNEYS

United States Patent Office 3,213,978
Patented Oct. 26, 1965

3,213,978
STRUCTURAL FITTINGS
Leonard O. Downes, 4077 2nd St., Wayne, Mich.
Filed May 18, 1962, Ser. No. 195,854
6 Claims. (Cl. 189—36)

The present invention relates to a fitting for a structural member and more particularly to a combination of a slotted bracket or the like and means for securing the bracket to a perforated structural member.

In the development of structural systems such as those described in certain copending patent applications, Serial No. 833,023, being related to new perforated structural members, and Serial No. 65,498 being related to a new cuboidal modular structural system, emphasis is laid on such concepts as simplicity and economy in manufacture, standardization of components coupled with versatility in use, readiness of assembly by relatively unskilled workmen using the minimum number of conventional tools, and complete salvageability of structural parts.

The present invention provides a bracket member and a means for securing the bracket member to perforated structural members like those described in the aforementioned copending patent applications and which has been developed to promote the objectives of these systems.

It is an object of the present invention to simplify structural systems by providing an improved bracket member capable of being used in a multitude of different ways.

It is another object of the present invention to simplify the assembly of structures by providing an improved bracket member and means for joining the bracket member to a perforated structural member which requires no tools or special skills.

It is still another object of the present invention to expand the utility of perforated structural members by providing a simplified clip member engageable with the perforations of the structual members to clamp a bracket to the structural member.

Other objects and advantages will readily occur to one skilled in the art to which the invention pertains upon reference to the following drawings in which like reference characters refer to like parts throughout the several views and in which FIG. 1 is a perspective view illustrating one use of a preferred embodiment of the present invention.

FIG. 2 is a top elevational view of the clip member shown in FIG. 1.

FIG. 3 is a side elevational view of the clip member shown in FIG. 2.

FIG. 4 is a cross sectional view taken substantially at line 4—4 of FIG. 3.

FIG. 5 is a view similar to FIG. 2 but illustrating another preferred clip member.

FIG. 6 is an elevational side view of the clip member shown in FIG. 5.

FIG. 7 is a cross sectional view taken substantially at line 7—7 of FIG. 6.

FIG. 8 is a plan view showing a use of the present invention with the use of a tubular structural member.

FIG. 9 is a plan view showing a use of the present invention with a channeled structural member, and FIG. 10 is a view taken substantially at line 10—10 of FIG. 9.

Now referring to the drawings for a more detailed description, FIG. 1 illustrates the present invention as comprising a bracket member 10 and a clip member 11. A structural member 12 is provided with a pair of faces 13–14 which adjoin at substantially a right angle. Each of the faces 13–14 is provided with a row of spaced perforations 15 and 16 respectively. The perforations 15 and 16 are preferably equally spaced from the adjoining sides of the faces 13–14 respectively. Each of the perforations 15 has its axis coplanar with the axis of a corresponding perforation 16.

The bracket member 10 may be Z-shaped in cross section, having a pair of adjoining faces 17–18 disposed complementary to and in engagement with said structural member faces 13–14 respectively. An elongated portion 19 extends angularly from the face 18 and is preferably provided with perforations 20 by which another structural member or the like (not shown) can be secured and supported.

The face 17 is provided with a pair of elongated slots 21–22 which are substantially parallel and angularly disposed with respect to the sides of the face 17. The slots 21–22 are disposed so that longitudinal displacement of the bracket member 10 with respect to the structural member 12 will bring the slots 21–22 simultaneously into registry with the perforations 15. Each of the slots 21–22 will register with only a single perforation 15 at any longitudinal position.

The face 18 is also provided with a pair of elongated slots 23–24 which are substantially parallel and angularly disposed with respect to the sides of the face 18. The slot 23 is disposed to have its longitudinal axis coplanar with the longitudinal axis of the slot 21. The slots 24 and 22 also have their longitudinal axes coplanar so that when the bracket member 10 is positioned to bring the slots 21–22 into registry with a pair of perforations 15, the slots 23–24 will be at the same time in registry with the corresponding perforations 16 provided on the face 18.

The clip member 11, as can best be seen in FIGS. 1–4 comprises an elongated body portion 25. An arcuate or circularly curved finger portion 26 extends laterally from one end of the body portion 25. A second arcuate or circularly curved finger 27 extends laterally from the opposite end of the body portion 25. The finger portions 26–27 are each formed on the same radius and are disposed with respect to the body portion 25 so that a plane tangent to the peripheral surfaces of the finger portions 26–27 will be parallel to the longitudinal axis of the body portion 25. In the embodiment shown in FIGS. 1–4, the finger portions 26–27 are of substantially the same length.

A preferred modification of the present invention is illustrated in FIGS. 5–7 where a clip member 111 is shown as having a body portion 125 and finger portions 126, 127. The clip member 111 is substantially like clip member 11 except the finger portion 127 is substantially less in length than the finger portion 126.

The finger portions 26–27 extend through the slots 23 and 24 respectively, the perforations 16, the perforations 15 and the slots 21 and 22 respectively. The bracket member 10 is then longitudinally displaced and resultant wedging against the finger portions 26–27 acts to lock the assembly together.

The preferred clip member 111 shown in FIGS. 5–7 is utilized in substantially the same manner except the finger portion 127 extends only through the slot 24 and the perforation 16.

FIG. 8 illustrates a pair of brackets 10 secured to a perforated tubular channel member 112 by a pair of clip members 11.

FIGS. 9 and 10 illustrate a pair of brackets 10 secured to a perforated channel member 212 by means of a pair of clip members 11.

Although I have described but two modifications of the present invention it will be apparent to one skilled in the art to which the invention pertains that many other changes and modifications can be made without departing from the spirit of the invention as expressed by the scope of the appended claims.

I claim:
1. In combination
(a) a structural member having a pair of adjoining faces,
(b) a bracket member having a pair of adjoining faces complementary to and engaging with said structural member,
(c) each of said bracket member faces being provided with an elongated slot extending angularly across said bracket member faces, said slots having their longitudinal axes in a common plane,
(d) each of said structural member faces having a plurality of longitudinally spaced perforations,
(e) each of said perforations on one face of said structural member having its axis contained in a common plane with the axis of a corresponding perforation on the other face of said structural member,
(f) each of said perforations being disposed in a position to register with one of said slots upon longitudinal movement of said bracket member with respect to said structural member, and
(g) a clip member having a circularly curved finger portion extending through said bracket member slots and through said structural member perforations in registry therewith to lock said bracket member to said structural member.
2. The combination as defined in claim 11 and in which
(a) said bracket member faces are each provided with a second elongated slot each respectively parallel with one of said first mentioned slots,
(b) said second slots each being disposed to register with another of said perforations, and
(c) said clip member having a second circularly curved finger portion extending through one of said second slots and through said perforation in registry therewith.
3. The combination as defined in claim 1 and in which
(a) said bracket member faces are each provided with a second elongated slot each respectively parallel with one of said first mentioned slots,
(b) said second slots each being disposed to register with another of said perforations, and
(c) said clip member having a second circularly curved finger portion extending through said second slots and through said structural member perforations in registry therewith.
4. In combination
(a) a structural member having a pair of faces adjoing at substantially a right angle,
(b) each of said faces being provided with a row of longitudinally spaced perforations,
(c) each of said perforations on one of said faces having its axis contained in a common plane with the axis of a corresponding perforation on the other face of said structural member,
(d) a bracket member having a pair of adjoining faces complementary to and engaging with said structural member faces,
(e) each of said bracket member faces being provided with an elongated closed slot angularly disposed with respect to the row of perforations on said engaging structural member face,
(f) one of said slots being in registry with a perforation on one of said structural member faces and the other of said slots being in registry with the corresponding perforation on the other of said structural member faces,
(g) a clip member for securing said bracket member to said structural member and comprising an elongated body portion having at one end a laterally extending circularly curved finger portion,
(h) said finger portion extending through said bracket member slot and through said structural member perforation in registry therewith.
5. The combination as defined in claim 4 and in which
(a) said bracket member faces are each provided with a second closed elongated slot parallel to said first mentioned slot,
(b) one of said second slots being in registry with a perforation one one of said structural member faces and the other of said second slots being in registry with the corresponding perforation on the other of said structural member faces,
(c) said clip member having a second circularly curved finger portion extending laterally from the end of said body portion opposite said first finger portion,
(d) said second finger portion extending through one of said second slots and through the perforation in registry therewith.
6. The combination as defined in claim 4 and in which
(a) said bracket member faces are each provided with a second elongated slot parallel to said first mentioned slot,
(b) one of said second slots being in registry with a perforation on one of said structural member faces and the other of said second slots being in registry with the corresponding perforation on the other of said structural member faces,
(c) said clip member having a second circularly curved finger portion extending laterally from the end of of said body portion opposite said first finger portion,
(d) said second finger portion extending through said second slots and through the perforations in registry therewith.

References Cited by the Examiner
UNITED STATES PATENTS

| | | | |
|---|---|---|---|
| 604,775 | 5/98 | Monteer | 189—35 |
| 720,623 | 2/03 | Russel | 20—95 |
| 1,093,326 | 4/14 | Haskell | 189—25 |
| 1,489,068 | 4/24 | Drake | 189—36 X |
| 1,625,866 | 4/27 | Pawling | 50—306 |
| 2,767,001 | 10/56 | Berend | 189—36 X |
| 2,932,368 | 4/60 | Schell | 189—35 X |

RICHARD W. COOKE, JR., *Primary Examiner.*
JACOB L. NACKENOFF, *Examiner.*